United States Patent
Emi

[19]

[11] Patent Number: 6,148,020
[45] Date of Patent: Nov. 14, 2000

[54] METHOD AND DEVICE FOR FREQUENCY HOPPING COMMUNICATION BY CHANGING A CARRIER FREQUENCY

[75] Inventor: Tetsuichi Emi, Ibaraki, Japan

[73] Assignee: Sanyo Electric Co., Ltd., Osaka, Japan

[21] Appl. No.: 08/816,785

[22] Filed: Mar. 19, 1997

[30] Foreign Application Priority Data

Mar. 22, 1996 [JP] Japan .................................. 8-065642

[51] Int. Cl.[7] .................................................. H04B 27/30
[52] U.S. Cl. ............................................ 375/132; 375/138
[58] Field of Search ..................................... 375/202, 200, 375/206, 286, 346, 209; 455/3.1, 3.3, 33.2, 54.1; 370/342

[56] References Cited

U.S. PATENT DOCUMENTS

| | | | |
|---|---|---|---|
| 4,320,514 | 3/1982 | Haskell .................................. | 375/202 |
| 4,383,323 | 5/1983 | Timor ..................................... | 375/202 |
| 4,435,821 | 3/1984 | Ito et al. ................................. | 375/202 |
| 4,558,453 | 12/1985 | Mimken ................................ | 375/202 |
| 4,597,087 | 6/1986 | Kadin ..................................... | 375/202 |
| 5,073,899 | 12/1991 | Collier et al. .......................... | 375/202 |
| 5,459,760 | 10/1995 | Watanabe ................................ | 375/202 |
| 5,541,954 | 7/1996 | Emi ........................................ | 375/202 |
| 5,581,547 | 12/1996 | Umeda et al. .......................... | 370/342 |

FOREIGN PATENT DOCUMENTS 3212037  9/1991  Japan .

OTHER PUBLICATIONS

Eimatsu Moriyama, et al., "Configuration and Basic Performance of Advanced Frequency–Hopping Spread Spectrum Communication Equipment for Land Mobile Radio", vol. 32, No. 164, Sep. 1986.

D.J. Goodman, et al., "Frequency–Hopped Multilevel FSK for Mobile Radio", The Bell System Technical Journal, vol. 59, No. 7, Sep. 1980.

*Primary Examiner*—Chi H. Pham
*Assistant Examiner*—Khai Tran
*Attorney, Agent, or Firm*—Hogan & Hartson, LLP

[57] ABSTRACT

A receiver block comprises a receiver circuit, a down-converter, a mixer, a modulator circuit, a decoding circuit, a synchronization circuit, a spread code control unit, and a frequency synthesizer. No synchronization holding circuit is needed. MSFK and PSK are used as a primary modulation. Synchronization is initially acquired by repeatedly mixing a part of the frequency hopping code sequence. Synchronization is improved during a period arranged separately from data communication periods. Before data transmission, the primary modulation components are fixed and transmitted for two code periods. The time changes in phases attributed to secondary modulation components will be known. After this, the primary modulation components are found.

21 Claims, 12 Drawing Sheets

RELATIONSHIP BETWEEN BIT STRINGS AND CODE WORDS

| BIT PATTERN | CODE WORDS |
|---|---|
| 0 0 0 | 7 - 6 - 5 - 2 - 4 - 1 - 3 |
| 0 0 1 | 6 - 7 - 4 - 3 - 5 - 0 - 2 |
| 0 1 0 | 5 - 4 - 7 - 0 - 6 - 3 - 1 |
| 0 1 1 | 4 - 5 - 6 - 1 - 7 - 2 - 0 |
| 1 0 0 | 3 - 2 - 1 - 6 - 0 - 5 - 7 |
| 1 0 1 | 2 - 3 - 0 - 7 - 1 - 4 - 6 |
| 1 1 0 | 1 - 0 - 3 - 4 - 2 - 7 - 5 |
| 1 1 1 | 0 - 1 - 2 - 5 - 3 - 6 - 4 |

METHOD AND DEVICE FOR FREQUENCY HOPPING COMMUNICATION BY CHANGING A CARRIER FREQUENCY

BACKGROUND OF THE INVENTION

1. Field of the Invention

This invention relates to a frequency hopping communication method and device, especially to sequentially changing carrier frequencies of transmitted data according to a frequency hopping spread code list. This is applicable to a spread spectrum communication using frequency hopping methods.

2. Description of the Prior Art

Spread spectrum communication is a communication method by spreading signals in bands frequency broader than the data to be transmitted. Its merits are, for example, high tolerance of interference, confidentiality, and applicability to high resolution distance measuring. It is used conventionally for satellite and ground communication. Recently, it is also being applied to mobile car communication and intercommunication (local area network communication), since it is expected to improve communication capacity for the same frequency band, and since it can co-exist with pre-existing systems.

Representative methods to implement spread spectrum communication include Direct Sequence (DS) and Frequency Hopping (FH) methods. DS methods spread the utilized frequency band by balance modulation of spread code pulses directly on data modulated by carriers. On the other hand, FH methods use broad frequency bands by changing (i.e., hopping) carrier frequencies of modulated data using spread code pulses. Particularly, by changing frequencies faster than information change speed, Fast Frequency Hopping (FHH) is more tolerant of interference, shows fewer far-to-near problems or frequency diversity effects, and is attractive for either mobile communication or indoor communication where the phasing effect is great.

In a normal FH method, generally speaking, Frequency Shift Keying (FSK) is used for modulating data. In other words, each several bits of data to be transmitted is converted into code words, and frequencies are shifted in accordance with codes (code word chips) which make code words. FIG. 1 shows a relationship between bit strings of data and code words being converted. As is shown in FIG. 1, every three bits of input data is converted into any of eight code word patterns. For example, if input data is 000, it is converted into 7-6-5-2-4-1-3. The integers "0" through "7" which constitute code words are simply called codes or code word chips. Their arrangement in each code word is designed so that a receiver can distinguish data of "000" through "111".

Different frequencies are assigned to each code. For example, frequencies of f0 through f7 correspond to codes of 0 through 7 one to one. If "000" is transmitted, frequencies will be changed in a sequence of f7, f6, f5, f2, f4, f1, f3 corresponding to code words 7-6-5-2-4-1-3. Since there are eight frequencies to be used, this modulation is called eight level MFSK (Multilevel FSK) in this case. Generally speaking, if there are $2^n$ modulation levels, the number of codes comprising one code word is less than $2^n-1$. Hereafter, modulation of data (modulation which has nothing to do with frequency hopping) is called primary modulation.

On the other hand, frequency hopping of carriers is done according to frequency hopping spread code sequence (i.e., pulse strings of pseudo noise code. Hereafter, it is simply called "code sequence".). For example, if there are 31 codes in the code sequence, there will be 31 choices of frequencies as hopping frequencies within a frequency band usable for communication. (Frequency hopping itself is included in FSK in a broader sense. However, in this description, FSK only means primary modulation.) A period in which a code sequence loops is called a code period, and a period in which a hopping frequency changes (in this case, 1/31 of the code period) is called a hopping period. Changing of hopping frequencies and frequency change by primary modulation are accomplished synchronously.

This kind of FH-MFSK method has up to this time been introduced in various publications as a highly harmonious combination. One representative example is "Frequency-Hopped Multilevel FSK for Mobile Radio" by J. D. Goodman et. al., The Bell System Technical Journal, Vol. 59 No. 7 p1257~1275, 1980. Furthermore, a combination method of M-ary FSK and FH is described in "Concept and Basic Characteristics of Experimental Device for Mobile Communication of Frequency Hopping" by E. Morimatsu et. al., Radio Wave Research Institute seasonal report Vol. 32, No. 164 p165~177, 1986.

Frequency methods, especially the FFH method, have general problems in synchronization acquisition by a frequency synthesizer in a receiver, and in keeping accurate synchronization, as well as in complicated hardware resulted from these. Therefore, coherent reverse spread method by delay correlation has been proposed as an easier method for receiving data.

Japanese Patent Laid-Open Publication No. Hei 03-212037 discloses a revised delay correlation method taking interference by other stations into consideration. In this method, the code sequence is divided into a former half and a latter half. The code sequence of the former half is modulated by data to be transmitted, and that of the latter half is modulated and transmitted by predetermined intermediate frequency signals. The receiver measures correlation of timing delay by a half of the code sequence. It extracts signal components in narrow band centered at a fixed intermediate frequency of the transmitter, and then demodulates data bits. FIGS. 2(A) through 2(E) show a code sequence and data demodulated by the receiver if the number of codes N=8. FIG. 2(A) shows a single sequence in which the latter four codes of a code sequence are shifted by an intermediate frequency fx. FIG. 2(B) shows four data values a–d to be conveyed upon the former four codes. FIG. 2(C) shows a signal sequence obtained by modulating the signal shown in FIG. 2(A) by the data shown in FIG. 2(B). FIGS. 2(D) and 2(E) show a signal sequence when demodulated by delay correlation performed by the receiver. Here, by mixing modulation signal (C) and signal (D) which is delayed by Td/2, carrier frequencies f1 through f4 are eliminated, and synthetics of the intermediate frequency and data are demodulated. In the same bulletin, it is stated that data signals can be transmitted not only by frequency modulation but also by phase modulation. As described above, interference by other stations can be decreased by allocating different intermediate frequencies to each station.

However, transmission efficiency is decreased in the above-described method, since information transmission is done for only half of the code sequence. Decreased transmission efficiency is obviously one of the most serious problems in communication.

On the other hand, in the FH-MFSK method, transmission efficiency will be raised by increasing the available frequencies for MFSK (i.e., level numbers in multilevel). However, increasing level numbers means wider frequency band to be used in MFSK. Since today a variety of communication devices use a plurality of frequency bands, available frequency bands for each communication method or communication device is regulated by laws regarding radio waves. In Japan, concerning a spread spectrum communication of FH-MFSK method, only a frequency band of 2471~2497 MHz is available for specific low-power data communication. A way of improving communication capacity for the same frequency band without raising MFSK level numbers is desired.

SUMMARY OF THE INVENTION

One object of this invention is to improve reception techniques in frequency hopping method, or to provide a method end a device that allows easier reception process and smaller hardware, as well as improvement in data transmission efficiency and communication capacity for the same frequency band. More specifically, one purpose of this invention is to provide a technique that enables adoption of modulation method, including phase modulation in FH method, with relatively smaller hardware.

The first object of this invention is to execute reception in frequency hopping communication easily, quickly, and with certainty. One aspect of this invention is a method to change a carrier frequency of a carrier to transmit data according to a spread code sequence for frequency hopping. A receiver block or a receiving apparatus repeatedly mixes a partial code string which is a part of the spread code sequence for frequency hopping with a received signal. It then executes synchronization acquisition by judging detection level, for example, of a predetermined frequency, by referring to a signal obtained by the mixing.

In this aspect, a transmitter block or a transmission apparatus transmits a signal, changing the carrier frequency according to the code sequence. The receiver block receives the signal and repeatedly mixes the partial code string with the received signals. As a result, each hopping frequency for each hopping period is properly detected when the partial code string to be mixed coincides with part of the original code sequence. For example, if detection level is good for a plurality of hopping periods, it is judged that synchronization has been acquired. According to this aspect, acquisition of synchronization can be done easily and with certainty. Also, the required time and certainty of acquisition can be changed in response to a reception condition if the length of the partial code string is made variable.

According to another aspect of the present invention, a number of codes comprising the partial code string (hereafter referred to as $N_p$) is chosen among integers more than 1 so that $N_p$ and a number of codes comprising the original code sequence (hereafter referred to as $N$) are relatively prime.

"Relatively prime" means not having common divisors. When $N_p$ and $N$ are in this relationship, the timing at which both code strings agree comes while the partial code string is repeatedly mixed with the code sequence. For example, if $N=5$ (each code is expressed as a number from 1 to 5), and $N_p=3$ (each code is expressed as a number from 1 to 3), a period of $N_p$ relative to that of $N$ shifts as follows:
N: 1234512345123 . . .
Np: 3123123123123 . . .
In this case, they coincide at the eleventh code from the start of mixing. Since the least common multiple of $N$ and $N_p$ is $NN_p$, there exists the timing from the start till $NN_p$, at which they agree. That the periods shift such that they eventually coincide is synonymous with the fact that $N$ and $N_p$ do not have a common divisor. In this aspect, synchronization acquisition is possible for any combination of numbers $N$ and $N_p$ at the start of the mixing. On the other hand, if $N$ and $N_p$ have a common divisor, for example if $N=4$ and $N_p=2$, a timing of coincidence may never come as follows depending on the initial combination of $N$ and $N_p$:
N: 123412341234 . . .
Np: 212121212121 . . .
Therefore, such $N_p$s will not be adopted. also in this aspect, cases of $N_p=1$ and $N_p=N$ are not included because of the definition of this aspect.

Synchronization acquisition for $N_p=1$ is known as acquisition by waiting, which generally has worse detection accuracy than the present invention. On the other hand, synchronization acquisition for $N_p=N$ is used in sliding correlators. It acquires synchronization by slightly sliding a timing of the code sequence of $N_p$. For this reason, it generally needs longer time before synchronization than this invention.

The second object of this invention is to simplify hardware necessary for reception, especially that for holding or maintaining synchronization. For this purpose, in one aspect of the present invention, at least periods of data communication and synchronization are arranged individually in a communication period. After synchronization acquisition, a receiver block measures detection level during the synchronization period while shifting hopping timings. It compares the detection level with that measured at an original timing without shift, and judges a difference in hopping timings of a transmitter block and the receiver block. Using this judgment, the receiver block synchronizes the hopping timings of the receiver block and the transmitter block.

Here, "synchronization acquisition" means a situation in which the timing of the code sequence of the transmitter block is acquired by the receiver block while slight adjustment of the timing might be necessary. Therefore, synchronization (i.e., to improve synchronization by slight adjustment of the timing) or synchronization alignment is necessary at this moment.

In this aspect, the receiver block acquires synchronization first, and aligns during the synchronization period. For this purpose, the receiver block measures detection level (a reception amplitude level) while shifting hopping timings, and compares it with the one measured before timing shift. If the level of the former is better, then the timing before timing shift is more suitable. If it is the opposite, then the timing of the latter is better. In this way, the receiver block judges a sign and a magnitude of the difference in hopping timings of the transmitter block and the receiver block, and then synchronizes.

In this aspect, data communication and synchronization periods individually exist. As a consequence, synchronization while receiving data is not necessary. As a result, it is not necessary to separate hardware for data transmission from that of synchronization, and it is possible to share the same hardware. Hardware for synchronization may be known as a "synchronization hold circuit" in the prior art frequency hopping communication device, while it is not necessary in the present invention. Hereafter, "synchronization hold" means a conventional way of synchronization which is performed while receiving data, and its usage differs from that of "synchronization" in this invention.

The third object of this invention is to provide a technique of FH method which enables adoption of a modulation method including, for example, phase modulation so that communication capacity for the same frequency band improves. For this purpose, in another aspect of this invention, data to be transmitted are primarily modulated and then secondarily modulated, changing a carrier frequency according to a spread code sequence for frequency hopping. A transmitter block transmits data fixing primary modulation components during a certain timing which may be prior to data transmission. On the other hand, using a signal received at different timings during a certain timing, a receiver block detects temporal changes of the primary and secondary modulation components. By retaining the temporal changes, the receiver block extracts the primary modulation components of the received signal and retrieves data upon data communication.

In this aspect, components attributed to the primary and secondary modulation are included in the received signal. Among them, components that are finally necessary for retrieving data are primary modulation components. Therefore, during a certain timing prior to the data transmission, the transmitter block transmits data fixing the primary modulation components. Using a signal received at different timings, the receiver block detects and retains the temporal changes in the primary modulation and the secondary modulation components. As a result, temporal changes of the modulation components at any arbitrary timings can be decided. Subtraction of changes in modulation components from a reverse spread signals leaves the primary modulation components, and the data can be retrieved. Since the changes in the modulation components are eliminated completely in this aspect, it is possible to adopt a primary modulation method such as PSK which is not readily combinable with certain types of secondary modulation methods, such as FH.

In still another aspect of the present invention, one period of a spread code sequence for frequency hopping is defined as one frame and modulation of data is defined as a primary modulation. In this aspect, a modulation method which includes at least phase shift is adopted as a primary modulation. A transmitter block transmits data fixing a phase of the primary modulation signal prior to data transmission. Based on signals received at corresponding hopping periods in two different frames, a receiver block stores a phase shift of the hopping frequency, in order to calculate a correction phase for the hopping period. The receiver decides a reference phase for each hopping period in each frame, using the correction phase. By comparing the reference phase with a phase a of signal received during the hopping period, the receiver block sequentially demodulates information based on a phase shift. One example of "a modulation method which includes at least phase shift" is Phase Shift Keying (PSK) modulation. In this aspect, prior to transmission of data, for example, the transmitter block fixes a phase of the primary modulation signal. This period is hereafter called a fixed transmission period.

On the other hand, the receiver block receives two different frames during the fixed transmission period. Using the signal received at the two frames, the receiver block finds the phase shift of the hopping frequency for hopping periods corresponding to each other in these frames and stores it as the correction phase. At frames sent at different timings, an included phase of the carrier which control each hopping period is assumed to shift. Therefore, the receiver block takes the correction phase into consideration, and decides the reference phase of each hopping period in each frame using the correction phase.

The reference phase is decided in this way, while actual data transmission is done afterwards. The transmitter block transmits data modulated by a modulation method which includes at least phase shift and the receiver block obtains information based on the phase shift by comparing the reference phase and a phase actually received at each hopping period in each frame.

By arranging the fixed transmission period, changes in the phase of the hopping frequency with time can be known. Therefore a phase modulation can be used as a primary method for frequency hopping communication.

In yet another aspect of the present invention, a primary modulation method which includes at least phase shift is adopted. An angle area comprising a plurality of angle areas within one of which the phase falls is held in advance. A receiver block sequentially obtains information based on the phase shift by individually deciding on which angle area the phase of a signal received at each hopping period in each frame falls. "Individually" means a method in which delay correlation is not used.

On the other hand, a frequency hopping communication device of the present invention sequentially changes a carrier frequency of a carrier to transmit data according to a spread code sequence for frequency hopping. The device comprises a receiver circuit which applies bandpass filtering to a received signal; a frequency converter which lowers frequency of an output signal of the receiver circuit to an aimed or a target frequency band; a spread control unit which performs spread control according to the spread code sequence for frequency hopping; a frequency synthesizer which supplies, by control of the spread control unit, frequencies corresponding to each hopping period; a mixer which mixes output of both the frequency synthesizer and the frequency converter; a demodulator circuit which demodulates at least a phase of an output signal of the mixer; a decoding circuit which judges a phase for each hopping period by using a demodulated phase; and a synchronization circuit which controls operation timings of the spread control unit according to an instruction from the demodulator circuit.

First, a transmitter block executes a primary modulation of the data to be transmitted. The transmitter block then transmits the data through a carrier which sequentially changes its frequency according to the code sequence. The device receives transmitted data and the receiver circuit applies filtering on the received signal. This process may be one which amplifies the received signal through, for example, a bandpass filter. Then the frequency converter, for example, a down-converter, lowers the frequency of the filtered signal to a frequency band usable by the device.

The spread control unit executes spread control according to the same code sequence used by the transmitter block. Timing of the actions by the spread control unit is controlled by the synchronization circuit. According to the control of the spread control unit, the frequency synthesizer sends out different frequencies corresponding to each hopping period. Outputs from the frequency synthesizer and from the frequency converter are mixed by the mixer. Using a signal resulting from this mixing process, a phase is finally detected or demodulated. Afterwards, the decoding circuit individually determines the phase for each hopping period using the detected phase. According to this aspect, communication using the PSK method as the primary modulation for frequency hopping becomes available, since information about the phase shift which is included in the received signal is obtained by the decoding circuit.

BRIEF DESCRIPTION OF THE DRAWINGS

FIG. 1 shows a relationship between data bit strings and the code words converted from them.

FIG. 7 shows a method of synchronization acquisition by the synchronization circuit.

DESCRIPTION OF THE PREFERRED EMBODIMENT

Figure 2A:
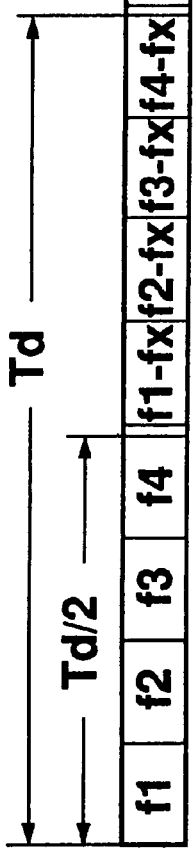
FIGS. 2(A), 2(B), 2(C), 2(D) and 2(E) show code sequences and the data demodulated by the reception block in case of chip number N=8 in the prior art.
Figure 2B:
Figure 2C:
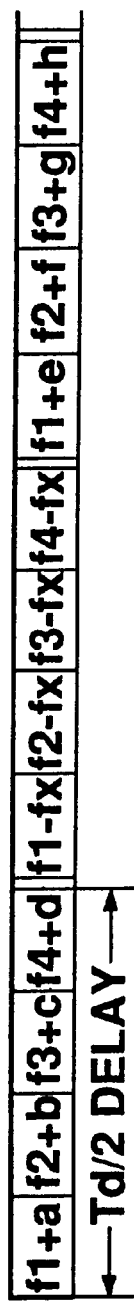
Figure 2D:
Figure 2E:
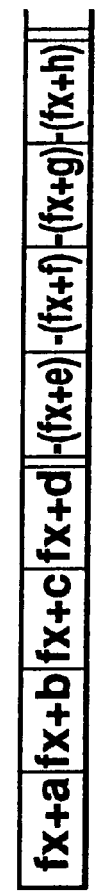

Here, a preferred embodiment of the frequency hopping communication device related to the present invention is explained referring to the drawings. Details of the frequency hopping communication method in the present invention will be clarified through this explanation of the device.

This invention combines PSK method with the conventional FH-MFSK method. In the FH method, frequencies are changed at each hopping period. Since changes in phases in accordance with the frequency change are not usually predictable, it is generally difficult to combine FH with PSK. PSK method is widely used in ordinary narrow band communication, and its general method of phase judgment is based on differential PSK for detecting a relative change in phases at end timing of an immediately proceeding demodulation unit period and at a starting timing of ongoing demodulation unit period. It is difficult to adopt this way in an FH method in which carrier frequencies change at each hopping period. In PSK method, it has conventionally been thought that finding an absolute phase at each demodulation unit period is not only difficult, but also without value. The present embodiment provides a device to judge the absolute phase under such circumstances and to fundamentally improve communication capacity for the same frequency band. Delay correlation, which is problematic in transmission speed, is not used here. This embodiment also provides a device which enables easier reception process and can be made using more compact hardware.

Figure 3:
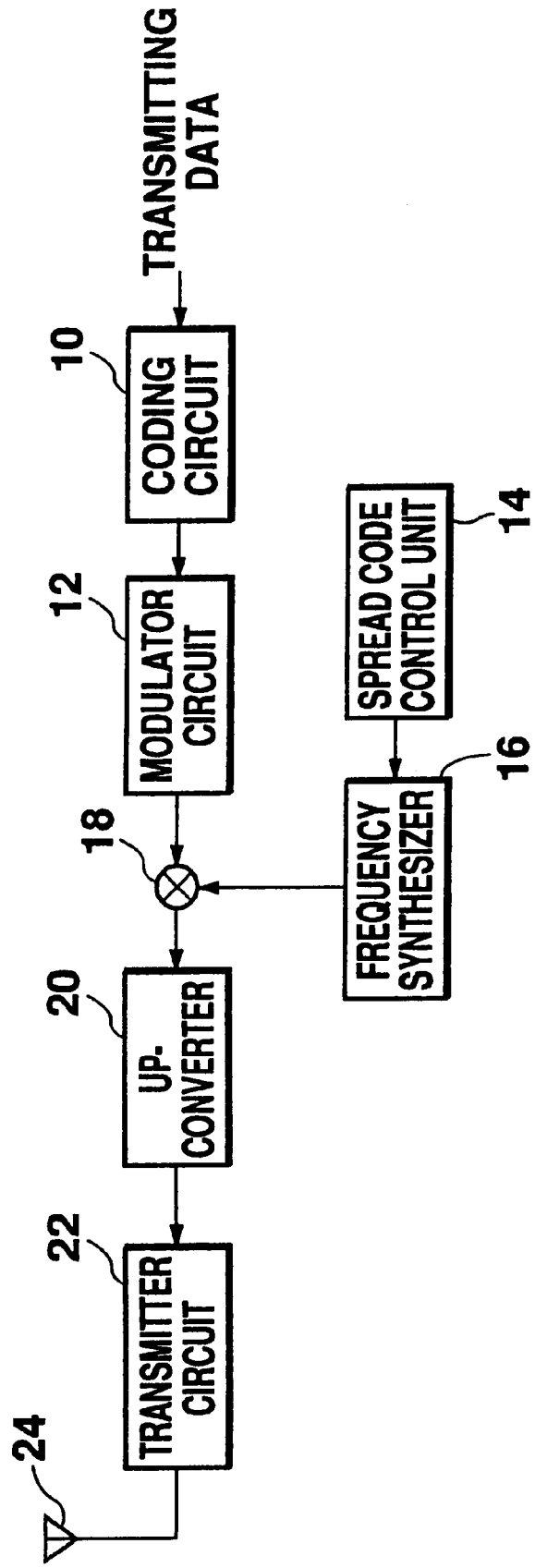
FIG. 3 shows a configuration of the transmission block of the frequency hopping communication device related to the present embodiment.
Figure 4:
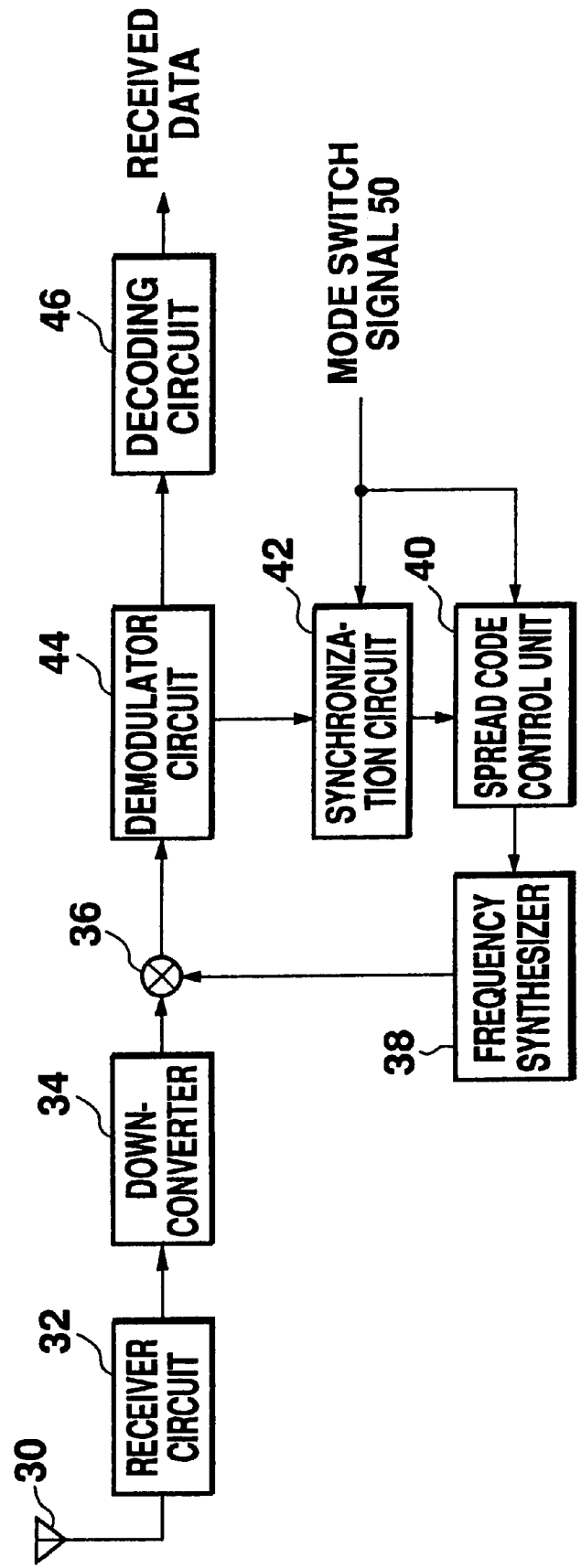
FIG. 4 shows a configuration of the reception block of the frequency hopping communication device related to the present embodiment.

FIG. 3 shows a configuration of a transmission block of the frequency hopping communication device related to this invention, while FIG. 4 shows a configuration for a reception block.

As shown in FIG. 3, the transmission block comprises a coding circuit 10 which takes in data to be transmitted and converts each several bits to code words, a modulator unit 12 which executes on converted data the primary modulation in combination of MFSK and PSK, a spread code control unit 14 which generates frequency data corresponding to each code of the code sequence, a frequency synthesizer 16 which outputs a signal while changing its frequency at each hopping period according to the data generated by the spread code control unit 14, a mixer 18 which mixes the output from both the modulator circuit 12 and the frequency synthesizer 16, an up-converter (a frequency converter) 20 which raises the output from the mixer 18 to a frequency band which is actually used for transmission, a transmitter circuit 22 which amplifies the output from the up-converter 20, and an antenna 24 from which the amplified spread spectrum signal is transmitted. The frequency synthesizer 16, which may be a direct digital synthesizer (DDS), converts the frequency data into actual waveform signals. Sequential switching of data to be transmitted is done at each timing change during hopping periods of the secondary modulation.

The reception block comprises an antenna 30 which receives the transmitted signal, a receiver circuit 32 which amplifies the received signal through a bandpass filter, and a down-converter (a frequency converter) which lowers frequency of the output signal from the receiver circuit 32 to a band usable by this device. The output from the down-converter 34 is mixed by a mixer 36 with output from a frequency synthesizer 38, and a reverse spread is done. Using timings indicated by a synchronization circuit 42, a spread code control unit 40 executes spread control based on the same code sequence as that of the transmitter. It also indicates frequencies and their changing timings to the frequency synthesizer 38.

The output signal from the mixer 36 is input to a demodulator circuit 44. After the demodulator circuit 44 executes analogue to digital (A/D) conversion of the received signals, it detects the frequency and the phase thereof by means such as Fast Fourier Transformer (FFT). It then supplies the detection result to a decoding circuit 46. The decoding circuit 46 reproduces the original data using the detected frequency and phase to thereby supply it as received data. The decoding circuit 46 holds reference phases and correction phases (described later) corresponding to each hopping frequency and executes phase judgment by comparing phases of the given signals with the reference phases.

Detection level of the frequency at the demodulator circuit 44 is given to the synchronization circuit 42 where synchronization initial acquisition and alignment are done. After synchronization acquisition, data communication is possible. A distinguishing characteristic of this present embodiment is that synchronization holding is not done simultaneously with data transmission, but synchronization (i.e., realization of best synchronous situation by slightly adjusting acquired synchronization) is done during a synchronization period which is arranged separately from the data transmission period. Consequently, the reception block of the present embodiment executes synchronization and data transmission by time division, so to speak. If synchronization holding were done in the same way as a conventional device does, the output from the down-converter 34 would be bifurcated, and another mixer, frequency synthesizer, and synchronization holding circuit would be necessary. These are not necessary in the present embodiment since data transmission period and synchronization period are separated. A mode switch signal 50 notifies both the synchronization circuit 42 and the spread code control unit 40 whether a current mode of the device is data transmission mode (which corresponds to the data transmission periods) or synchronization mode (which corresponds to the synchronization periods).

Operation of the transmission block will be now explained. Operations during data transmission periods will be detailed, while those during periods other than data transmission will be appropriately mentioned in an explanation of the reception block operation.

Data to be transmitted is input to the coding circuit 10 and then converted into code words as shown in FIG. 1. In the modulator circuit 12, modulation corresponding to codes "0" through "7", is done by both frequency shift and phase shift. A number generally used for spread spectrum communication by the MFSK is, for example, 0.8 MHz for a frequency modulation range. Here, frequencies selected by the MKSK are assumed to be 0.2/0.4/0.6/0.8 Mhz (expressed as $f^{(1)}$ to $f^{(4)}$ respectively.) The modulation by the PSK is assumed to have 2 levels, and phases are assumed to be 0° or 180° (expressed as $\Phi^{(1)}$ and $\Phi^{(2)}$ respectively). Each code is expressed by eight ways of combination of $f^{(1)}$ to $f^{(4)}$ and $\Phi^{(1)}$ or $\Phi^{(2)}$. For example, code "0" is expressed by $f^{(1)}$ $\Phi^{(1)}$. This is the primary modulation.

On the other hand, the secondary modulation is done by the spread code control unit 14 and the frequency synthesizer 16. For example, when the code sequence is made of 31 codes, the spread code control unit 14 supplies 31 different frequency data at each code period, and the frequency synthesizer 16 sends out 31 different frequencies according to these data, while changing them at each hopping period. In general spread spectrum communication, an average of frequency modulation by the frequency hopping is about 25 MHz. 31 hopping frequencies are chosen within this range. Therefore, frequencies may change within a range of about 25.8 MHz, which is the sum of the ranges of the primary and the secondary modulations.

The mixer 18 mixes the outputs of the modulator circuit 12 and the frequency synthesizer 16, and a spread spectrum signal is generated. This signal is up-converted to about 2.5 GHz zone and transmitted after amplification.

Operation of the reception block will now be explained. A complete flow will first be explained briefly, to be followed by a detailed explanation of each process.

[1] Complete Sequence

Figure 5:
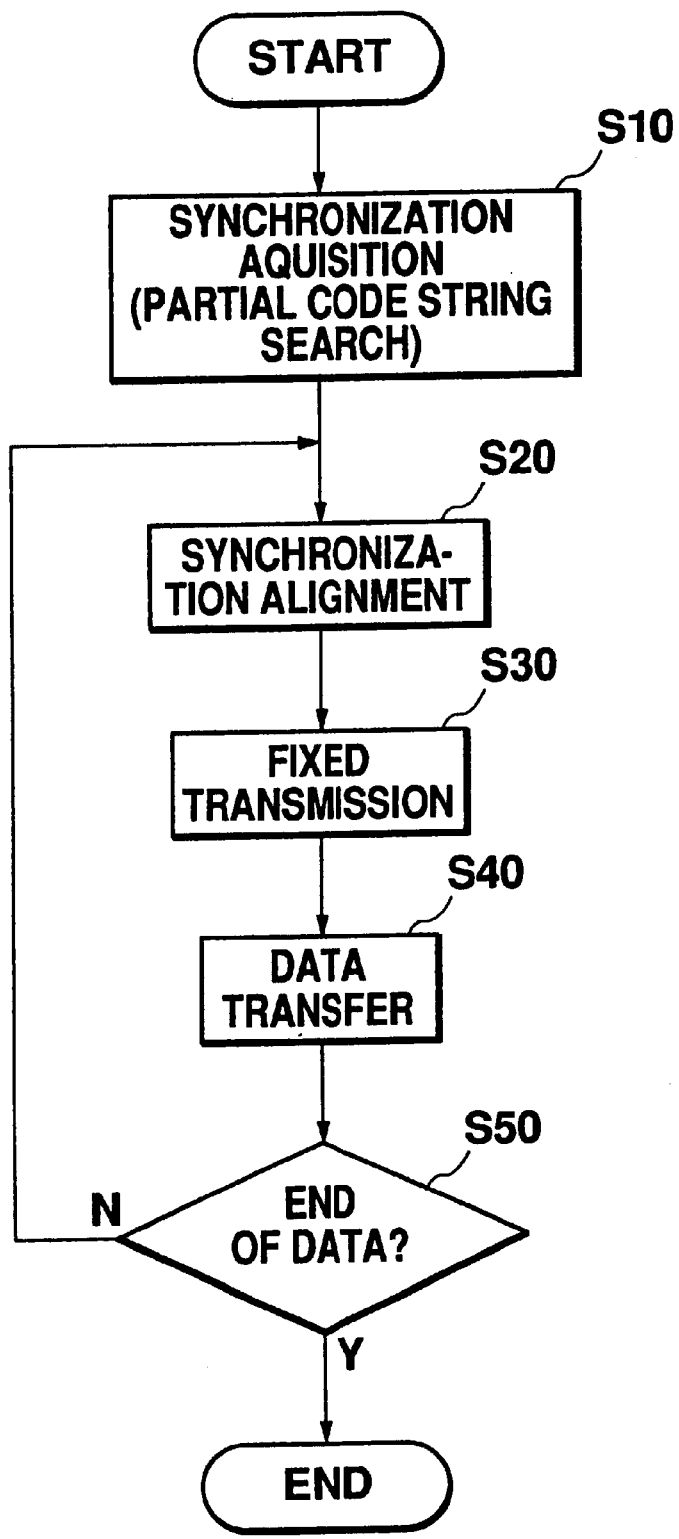
FIG. 5 is a flow chart showing reception procedures in the reception block.

FIG. 5 is a flow chart showing reception procedure by the reception block. As is shown in FIG. 5, once communication starts, synchronization acquisition (S10) is done by the synchronization circuit 42 shown in FIG. 4. This period is called a synchronization acquisition period. After synchronization acquisition, the block shifts to a synchronization period where the best synchronization is realized, and synchronization is done (S20). After this, the transmission block transmits a signal fixing the modulation by the MFSK and the PSK at certain values (S30). This period is called a fixed transmission period. Since here the MFSK modulation has 4 levels ($f^{(1)}$, $f^{(2)}$, $f^{(3)}$, $f^{(4)}$), and the PSK modulation has 2 levels ($\phi^{(1)}$, $\phi^{(2)}$), the signal is transmitted in the fixed transmission period with $f^{(1)}$ fixed as the primary modulation frequency and with $\phi^{(1)}$ fixed as the primary modulation phase. This is done for calculation of the later-described correction phases.

At this stage, the reception block has information for proper reception, and the device shifts to the data transmission period (S40) for ordinary data transmission. After this, the block checks if there are the following data (S50) after it transmits a certain amount of data. If this data is present, the procedure is repeated from the synchronization.

Figure 6:
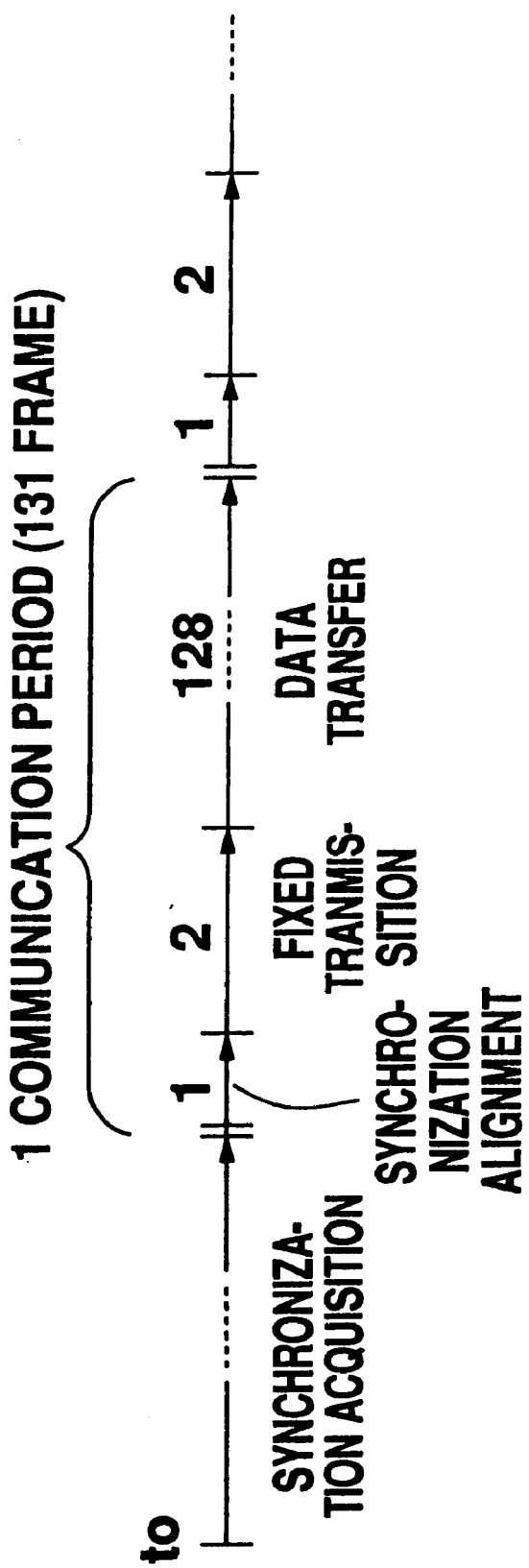
FIG. 6 shows each period of the process related to the present embodiment.

FIG. 6 shows periods of each process described above. At a time of t0 in FIG. 6, reception block operations begin. Through the synchronization acquisition period, synchronization is acquired. The time necessary for this process depends on designs of the device and reception conditions. Once the synchronization is acquired, the reception block notifies the transmission block of an end of synchronization acquisition. Both blocks then move to the synchronization period. In the present embodiment, this period of synchronization is defined as 1 frame. During this period, the reception block adjusts synchronization and shifts to a 2-frame fixed transmission period. After this comes a 128-frame data transmission period. One communication period is composed of a total of 131 frames. Both the transmission and reception blocks are assumed to know this format in advance.

[2] Synchronization Acquisition (S10)

In the present embodiment, a partial code string, which is a part of the code sequence, is repeatedly mixed with the received signal by cooperation of the synchronization circuit 42, the spread control unit 40, and the frequency synthesizer 38. In other words, the hopping frequency corresponding to each code included in the partial code string is mixed with the received signal and is changed at each hopping period. If a strong correlation between the hopping frequency and the frequency of the received signal is detected as a result of the mixing (i.e., if the detection level is high), synchronization is deemed to be acquired. Hereafter, this method is called partial code string search.

Figure 7:
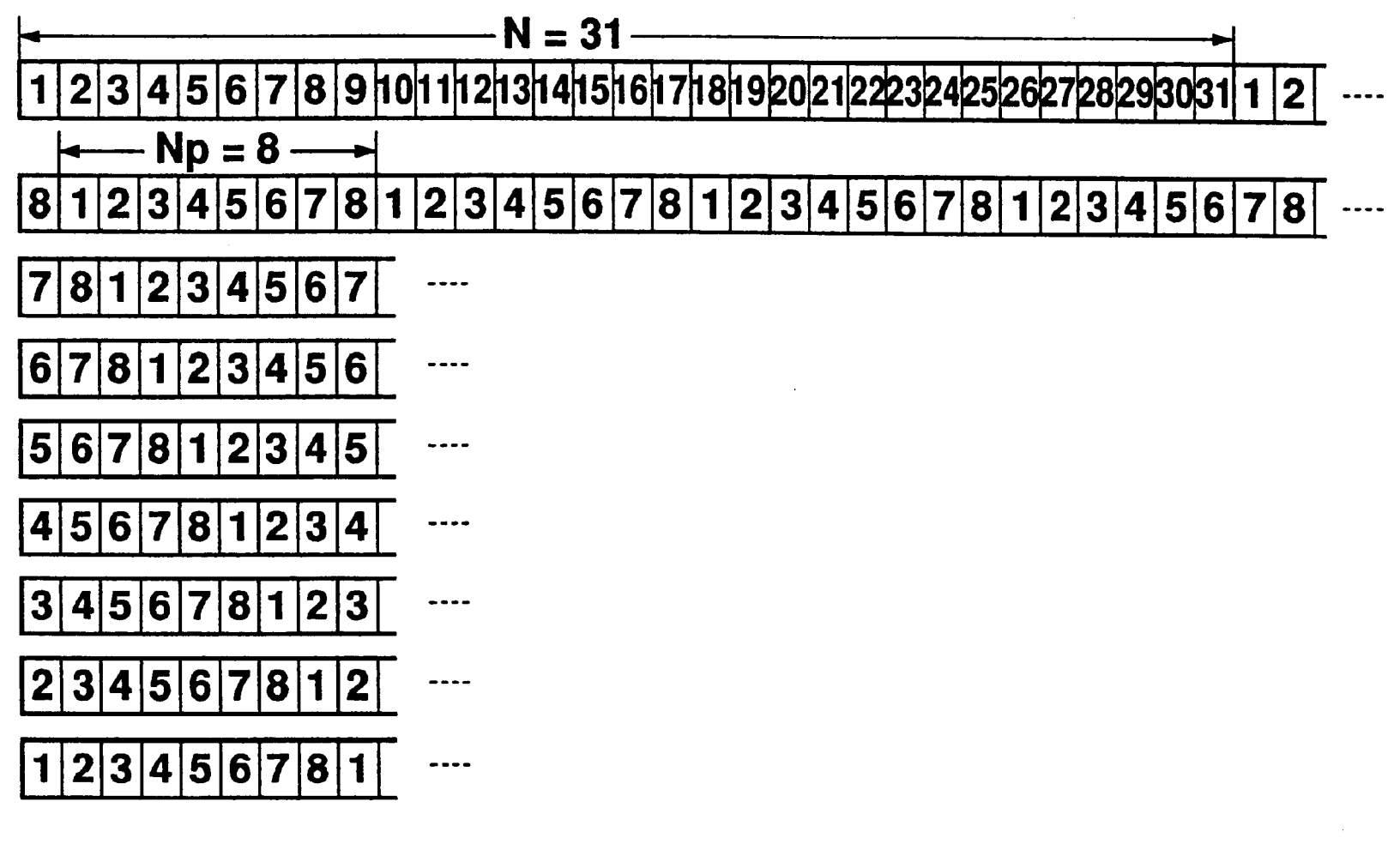

FIG. 7 shows a way of synchronization acquisition by the synchronization circuit 42. In FIG. 7, the number N of codes included in the code sequence is 31, and the number Np of the codes included in the partial code string is 8. Generally speaking, N is equal to $2^n-1$, so Np is chosen to be $2^k$ (k<n). When Np is selected so that N and Np are relatively prime, the partial code string gradually shifts as shown in FIG. 7. Eventually timings of both coincide. In FIG. 7, the partial code string search is repeated with Np=8. Therefore, an offset by one code relative to the code sequence of N=31 occurs in one code period. As a result, at the eighth period of the code, timings of both agree. This falls within the 31×7+1=218th code from the start of mixing.

The synchronization circuit 42 finds the coincidence of the timing by monitoring the frequency. In other words, by monitoring the hopping frequency corresponding to each of the 8 codes in the partial code string, it judges that synchronization is acquired when frequencies for more than a certain number of codes among the 8 codes are detected (i.e., the detection level exceeds a certain threshold value). Another way to judge the synchronization acquisition is to measure in analogue the detection level of the frequency for each code. When a total detection levels for the 8 codes exceeds a certain threshold value, it is judged that synchronization acquisition has been accomplished. In FIG. 7, the starting timing of the hopping period of the transmission block happens to coincide with that of the reception block. However, it is not usual that these coincide. In cases that they do not coincide, the threshold values described above may be gradually reduced until synchronization is acquired.

The spread code control unit 40 is informed when synchronization is acquired by the synchronization circuit 42. The spread code control unit 40 then stops the partial code string search and then supplies to the frequency synthesizer 38 frequency data strings corresponding to a sequel of the original code sequence and prepares for data communication.

In this process, Np may be variable. Generally speaking, the greater Np is, the longer the elapsed time by synchronization acquisition becomes, though accuracy of synchronization detection improves. A process for automatically changing Np depending on a status of reception is thereby possible.

[3] Synchronization (S20)

As was described in S10, at the time of synchronization acquisition, a timing disagreement smaller than 1 hopping period may exist between the timings of both the transmission and the reception blocks, and is adjusted during the synchronization period. Here, the adjustment is done in a unit of ¼ of the hopping period. By the mode switch signal 50 in FIG. 4, the reception block enters the synchronization mode.

Figure 8:
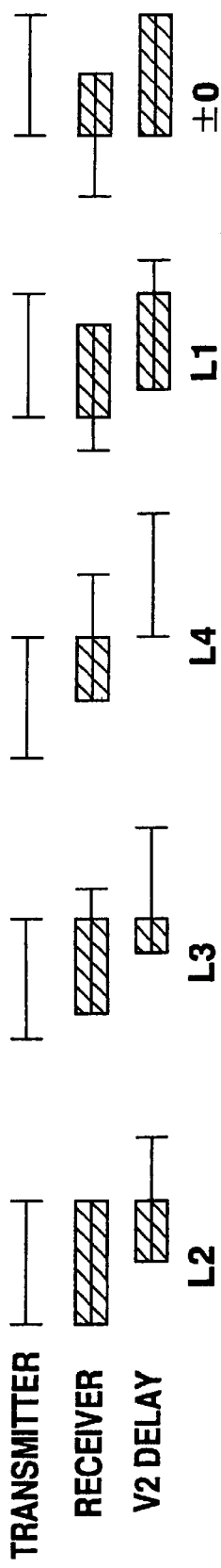
FIGS. 8(a), 8(b), 8(c), 8(d) and 8(e) show synchronization procedures.

FIGS. 8(*a*), 8(*b*), 8(*c*), 8(*d*) and 8(*e*) show synchronization procedures. In each figure, one hopping period at the transmission block is shown at the top, and one hopping period at the reception block is shown in the middle. A period obtained by delaying the hopping period at the reception block by ½ is depicted at the bottom. In each figure, overlapping portions between the two blocks show periods in which synchronization is held.

As is shown in these figures, the reception block measures detection levels before and after the hopping period is shifted by ½ and it then compares them. Comparison results and following procedure are described below.

1. FIG. 8(*a*)

The detection level reduces to half. The hopping period after delaying is shifted towards the left by ⅔ (L2).

2. FIG. 8(*b*)

The detection level becomes less than half. The hopping period after delaying is shifted towards the left by ¾ (L3).

3. FIG. 8(*c*)

The detection level becomes 0. The hopping period after delaying is shifted towards the left by 4/4 (L4).

4. FIG. 8(*d*)

The detection level does not change. The hopping period after delaying is shift towards the left by ¼ (L1).

5. FIG. 8(*e*)

The detection level increases. The hopping period after delaying is held constant (±0).

In the present embodiment, adjustment of the hopping period are done by judging which pattern described above fits a situation after taking an average of the comparison results for, for example, 8 hopping periods. In this embodiment, the synchronization period is defined as one frame. One frame is comprised of 31 hopping periods, which is sufficient for synchronization. By trying adjustment 2 or 3 times in the synchronization period, accuracy of synchronization improves.

Here, the adjustment is done by shifting the hopping period by ¼. Timing errors between the transmission and the reception blocks will therefore fall within ⅛ of the hopping period.

[4] Fixed Transmission

Next, the device moves to the fixed transmission period. By the mode switch signal 50 in FIG. 4, the reception block enters a mode for ordinary data transmission. In this mode, no adjustment of hopping period is provided.

The fixed transmission is necessary to separate meaningful phase shifts attributed to the PSK from meaningless ones simply attributed to elapse of time between the frames, since the PSK is included in the primary modulation in this embodiment. A crucial key for the solution lies in the technical concept that the phase at each hopping period is not judged by a relative phase to the one at an ending timing of the immediately proceeding hopping period, but by comparison with a phase at the same hopping period in the immediately proceeding frame. In this way, PSK can be used for communication in the FH method.

The present embodiment considers the fact that each hopping frequency is constant at corresponding hopping periods in every frame. When communication proceeds from one frame to another, the phase shift of the carrier in the same hopping period (which attributes to the secondary modulation only) is retrieved irrespective of the phase shift in other hopping periods. Once phase shifts attributable to the secondary modulation are known, phase shifts attributable to the PSK are found and data can then be demodulated.

For convenience of explanation, some parameters are defined here, using non-negative integers i and j.

The ith frame–Fi

The jth hopping period included in Fi–Hij

The phase of the received signal at Hij–$\phi ij$ (measured at the starting timing of Hij)

The correction phase of Hxj (x arbitrary)–$\Delta\Phi fj$

The reference phase of Hij–$\phi_S ij$

Figure 9:
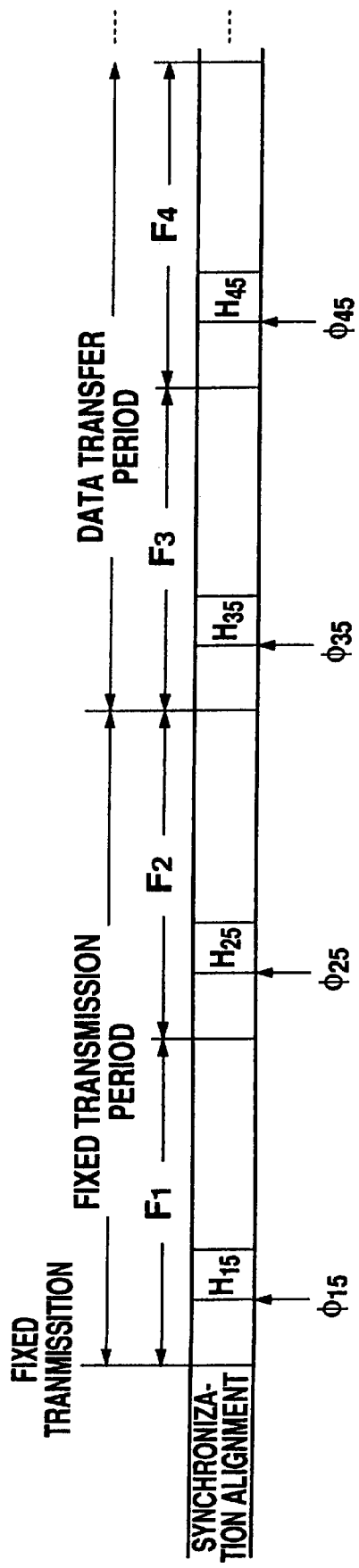
FIG. 9 is a diagram explaining one method to calculate the fixed transmission, the correction phases, and the reference phases.

FIG. 9 shows how the correction phase and the reference phase are calculated. As is shown in FIG. 9, the fixed transmission period composed of frames F1 and F2 exists following the synchronization period. Here, the phases of the received signal at starting timings of the hopping periods of H15 and H25, which correspond to F1 and F2 respectively, are $\phi 15$ and $\phi 25$. Therefore, the correction phase is $$\Delta\phi 5 = \phi 25 - \phi 15 \qquad \text{(equation 1)}.$$

A general form of the equation is $$\Delta\phi j = \phi 2j - \phi 1j \qquad \text{(equation 2)}.$$

Since the primary modulation components are fixed during the fixed transmission periods, the correction phases of equations 1 and 2 show components which are purely attributed to the secondary modulation. In other words, as the next frame arrives, the phase advances at each hopping period by the correction phase attributed to the secondary modulation.

Now, the reference phase $\phi_S ij$ is defined as follows:

$$\phi_S ij = \phi 1j + (i-1)\Delta\phi j (i=3,4\ldots) \qquad \text{(equation 3)}.$$

Among the $\phi ij$ for an arbitrary Hij, this equation generally shows components attributed to the secondary modulation, and the correction phases are added one by one at each advancement of the frame.

Using equation 2, the reception block sequentially calculates the correction phases related to each hopping period while receiving the frame F2. It then stores them in a memory in the decoding circuit 46. The reference phases are used for arbitrary frames after the block shifts to the data transmission period. Therefore, they are stored as equations substituting $\Delta\phi j$ of equation 3 by the calculated correction phases.

Here, the correction phases are calculated for two neighboring frames. However, these frames are not necessarily adjacent to each other. If the frames are separated by a certain time, the correction phases are calculated by dividing the phase shift by an interval of the frames. In this case, the correction phases are calculated after storing some amount of the phase shift data, and the correction phases will be more accurate. However, in the phase shifts, components which are multiples of 360° are not known. Consequently, the phase shift for neighboring frames may be calculated to a certain accuracy.

[5] Data Transmission (S40)

Next, the reception block moves to the data transmission period and data transmission begins. After frame F3, the primary modulation components also change. Frequency and phase of the base band signal output from the mixer 36 shown in FIG. 4 are detected by the modulator circuit 44. Using the detected frequency and phase, the decoding circuit 46 retrieves codes included in code words for each period. For example, "7-6-5-2-4-3-1" leads to a bit pattern "000" according to FIG. 1. After this process, the decoding circuit 46 executes a parallel/serial conversion and sequentially supplies three "0"s.

Between the judgment of the frequency and the phase by the decoding circuit 46, the former is done by a known method (frequency is assumed to be one of $f^{(1)}$ to $f^{(4)}$), while the latter is accomplished by using the reference phases in the proceeding process. For example, the reference phase related to H35 in FIG. 9 is calculated as follows:

$$\theta_s 35 = \phi 15 + 2\Delta\phi 5 \quad \text{(equation 4)}.$$

The phase which was actually detected during that hopping period is $\phi 35$. The component included in this phase which is attributed to the primary modulation (defined as $\theta 35$) is found as follows:

$$\theta 35 = \phi 35 - \phi_s 35 \quad \text{(equation 5)}.$$

If the PSK used here is 4 level Quadrature PSK (QPSK), it is judged which phase of 0/90/180/270° $\theta 35$ falls within. From equations 4 and 5, a general equation is defined as follows:

$$\theta ij = \phi ij - \phi_s ij = \phi ij - \phi 1j - (i-1)\Delta\phi j (i=3,4\ldots).$$

Based on the parameters obtained during the fixed transmission period, the phase attributed to the primary modulation is found. The $\theta ij$s are absolute phases found individually for each period.

Figures 10, 11A, 11B, 11C:
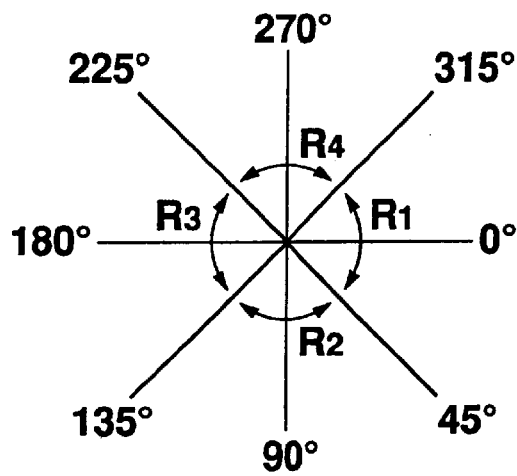
FIG. 10 is a diagram to show one method how angle areas used for phase judgment are divided.
FIGS. 11(a), 11(b) and 11(c) show one method to judge phases of $\theta_{ij}$ when $\theta_{ij}$ falls within each of R1–R4.

FIG. 10 is a diagram showing how angle areas used for phase judgment are divided. In this figure, equal areas centered at 0°, 90°, 180°, and 270° are shown. These areas are named R1 to R4 respectively. $\theta ij$ falls within any of these areas.

FIGS. 11(a), 11(b) and 11(c) show how the phases of $\theta ij$ are judged when $\theta ij$ falls within each of R1–R4. FIG. 11(a) shows the most common method of judgment, and R1–R4 are judged to be 0°, 90°, 180°, and 270° respectively. FIGS. 11(b) and 11(c) provide new methods of judgment. In FIG. 11(b), when $\theta ij$ falls within either R2 or R4, its phase is judged to be both 0° and 180°. In FIG. 11(c), it is judged to be neither 0° nor 180° for the same case. In other words, angle areas of R2 and R4 are to be defined as areas of "plural information" in FIG. 11(b) and areas of "no information" in FIG. 11(c).

Figure 12:
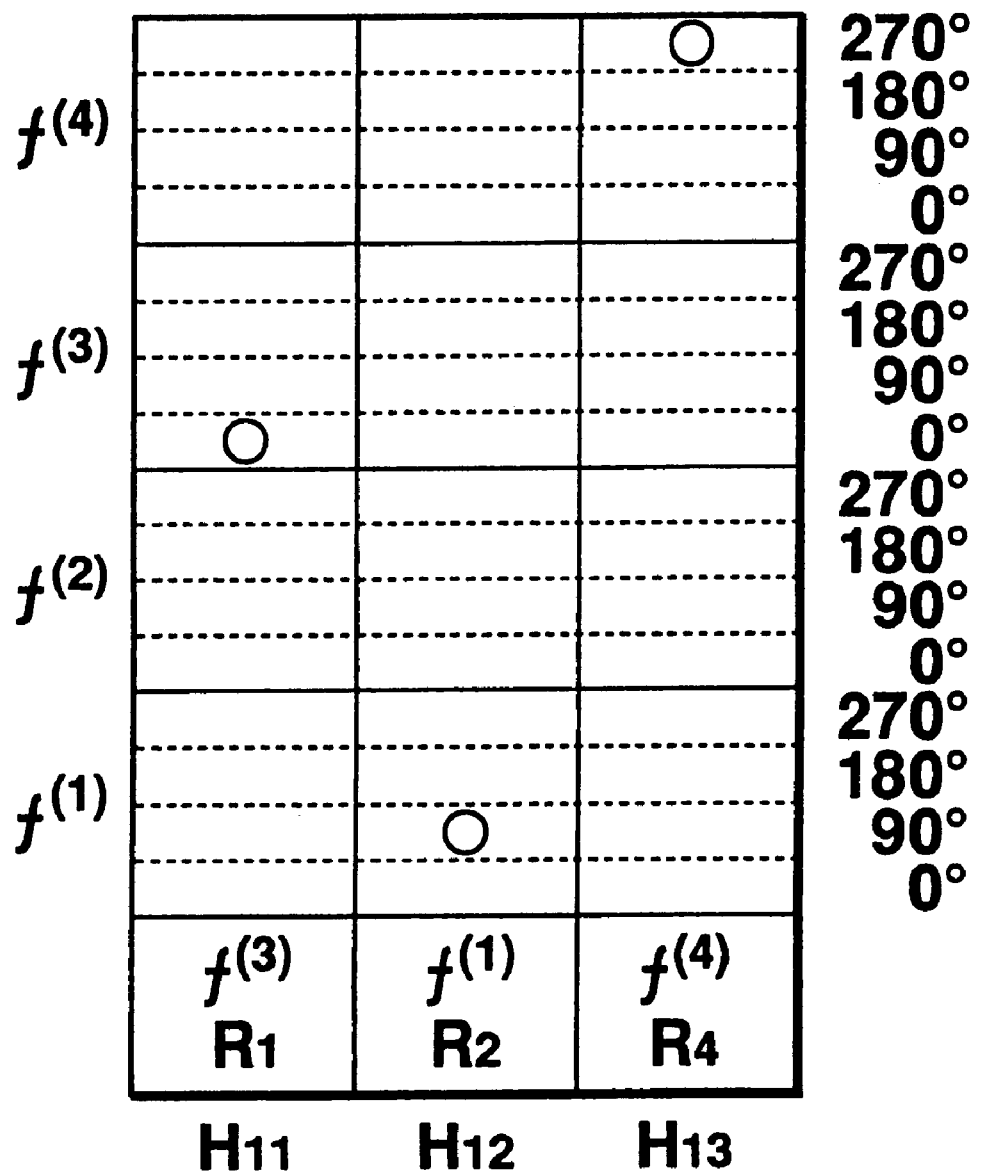
FIG. 12 is a diagram showing a phase judgment result from the method shown in FIG. 11(a).
Figure 13:
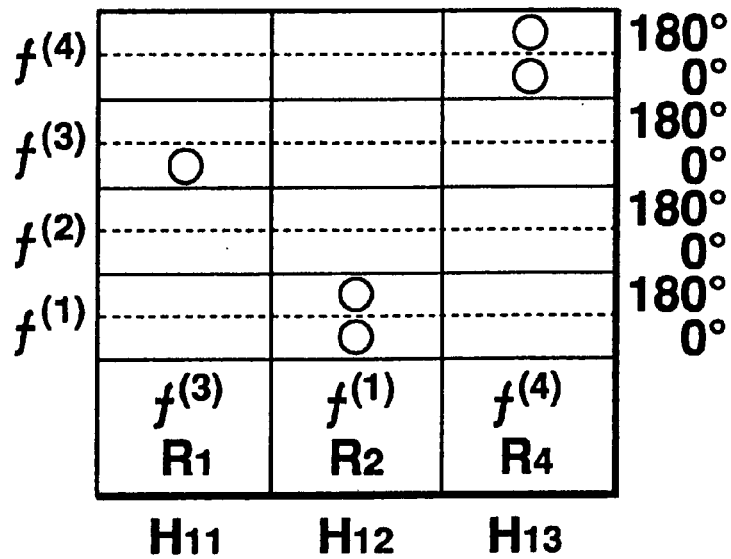
FIG. 13 is a diagram showing a phase judgment result from the method shown in FIG. 11(b).
Figure 14:
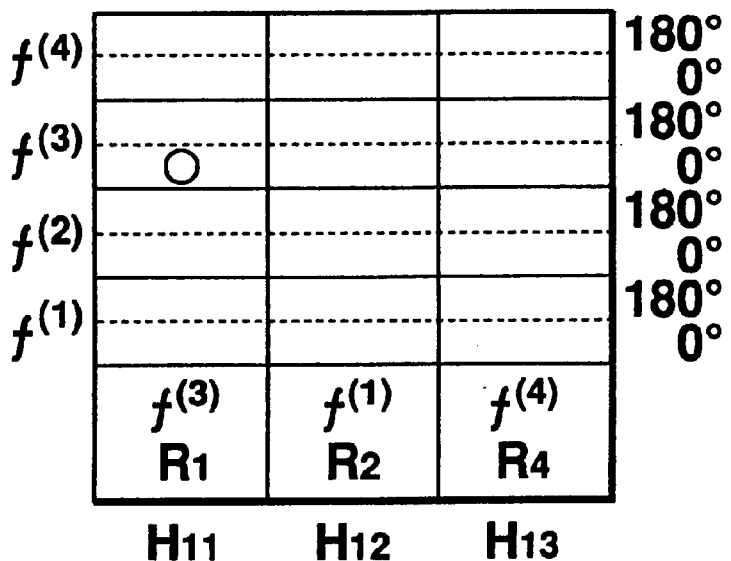
FIG. 14 is a diagram showing the phase judgment result from the method shown in FIG. 11(c).

FIGS. 12–14 show the judgment results (frequency-phase tables) according to FIGS. 11(a)–11(c), which describe cases wherein consecutive hopping periods H11, H12, and H13, frequencies are judged to be $f^{(3)}$, $f^{(1)}$, and $f^{(4)}$, respectively, and the phases fall within R1, R2, and R4. FIGS. 12–14, all have four values regarding frequencies. However, with regard to phases, FIG. 12 has four values, while FIGS. 13 and 14 have two. There are only two values because there are only two ways of phase judgment in FIGS. 11(b) and 11(c).

In FIG. 12, for H11, H12, and H13, the frequencies and phases are judged to be $f^{(3)}$ and 0°, $f^{(1)}$ and 90°, and $f^{(4)}$ and 270°. For the same cases in FIG. 13, they are $f^{(3)}$ and 0°, $f^{(1)}$ and 0° and 180°, and $f^{(4)}$ and 0° and 180°, in the same order.

In FIG. 14, they are $f^{(3)}$ and 0° for H11, and no judgment is made for H12 and H13. Since data to be transmitted is specified by combinations of the tables in FIGS. 12–14, and "○"s drawn on them, various types of transmission will be possible through this embodiment. Furthermore, if it can be designed that judging strategy can be switched during communication among FIGS. 11(a)–11(c), communication capacity for the same frequency band will improve.

Moreover, the no-information areas in FIG. 14 can be used not only for telling that there is no information, but also for ignoring ambiguous phases caused by communication errors.

[6] Re-synchronization (S50)

One communication period completes in 131 frames. If data transmission is not finished during this period, the reception block goes back to S20 and executes the procedures after synchronization. Since synchronization holding action is not performed in this embodiment, synchronization might be gradually lost during the data transmission period and re-synchronization may be necessary. Maximal length of data transmission period may be decided by examining the predicted synchronization lag calculated based on temperature characteristics of circuit parts of the device and the like.

The above outlines the operation flow for this embodiment. Since it is possible in this embodiment to add PSK to the primary modulation of the FH method, communication capacity for the predetermined frequency band can be improved.

Although BPSK and QPSK have mainly been explained here, other PSK methods may, of course, be adopted. Likewise, other methods such as M-ary FSK may be adopted for the FSK or the MFSK. Moreover, the present embodiment is applicable to cases in which only phase modulation such as the PSK is used as the primary modulation, even though the combination method of MFSK and PSK is used as the primary modulation in this embodiment.

While here have been described what are at present considered to be preferred embodiments of this invention, it will be understood that various modifications may be made thereto, and it is intended that the appended claims cover all such modifications as fall within the true spirit and scope of the invention.

What is claimed is:

1. A communication method comprising:

sequentially changing a carrier frequency of a carrier to transmit data according to a spread code sequence for frequency hopping; and repeatedly mixing a partial code string that is a part of the spread code sequence with a received signal and performs synchronization acquisition by judging detection level by referring to a signal obtained by the mixing.

2. The method as claimed in claim 1, wherein the hopping frequency corresponding to each code included in the partial code string is changed and mixed with the received signal at each hopping period, and synchronization is judged to be acquired when a sufficient correlation between the hopping frequency and frequency of the received signal is detected.

3. The method as claimed in claim 1, wherein a number of codes which constitute the partial code string is chosen among numbers more than one so that the number of code which constitute the partial code string and a number of codes which constitute the spread code sequence are relatively prime.

4. The method as claimed in claim 1, wherein a number of codes which constitute the partial code string is variable.

5. A communication method comprising:
sequentially changing a carrier frequency of a carrier to transmit data according to a spread, code sequence for frequency hopping, wherein at least a data communication period and a synchronization period are provided separately within a communication period;
after synchronization acquisition, measuring a detection level during the synchronization period while shifting hopping timing;
judging a difference in hopping timings between received and transmitted signals by comparing the detection level with detection level measured at an original timing without shift; and
performing synchronization of the hopping timings between the received and transmitted signals according to the judgment.

6. The method as claimed in claim 5 wherein a receiver block executes, in time division, both data reception during the data transmission period and synchronization during the synchronization period, by switching modes of one piece of hardware.

7. A communication method using a primary modulation of data to be transmitted and a secondary modulation using frequency hopping, comprising:
sequentially changing a carrier frequency of a carrier to transmit the data according to a spread code sequence for frequency hopping;
transmitting data while fixing a primary modulation component during a predetermined period; and
detecting and holding temporal changes of the primary modulation component and a secondary modulation component by comparing data receipted at different timings to thereby reproduce original data by extracting the primary modulation component of data received during data communication.

8. The method as claimed in claim 7, wherein the predetermined period precedes data communication period.

9. A communication method comprising:
sequentially changing a carrier frequency of a carrier to transmit data according to a spread code sequence for frequency hopping in which one period of the spread code sequence for frequency hopping is defined as one frame and a modulation of data as a primary modulation;
modulating data including at least phase shift as a primary modulation;
transmitting data while fixing a phase of the primary modulation signal;
storing a phase shift of the hopping frequency, obtained by comparing the signals received at corresponding hopping periods in two different frames, in order to determine a correction phase for the hopping period;
deciding a reference phase for each hopping period in each frame using the correction phase; and
sequentially obtaining information based on the phase shift by comparing the phase of a signal actually received during the hopping period with the corresponding reference phase.

10. The method as claimed in claim 9, wherein
the correction phase is calculated for each hopping period by dividing the phase shift by an interval of the two different frames; and the reference phase is calculated by adding the corresponding correction phase to each hopping period each time a frame is received.

11. The method as claimed in claim 9, wherein
the primary modulation includes frequency shift in addition to phase shift; and a transmitter block transmits data while fixing frequency as well as the phase of the primary modulation signal.

12. The method as claimed in claim 9, wherein 10 transmitter block transmits the data while fixing the phase of the primary modulation signal before starting data transmission.

13. The method as claimed 11, wherein 10 transmitter block transmits the data while fixing the frequency as well as the phase of the primary modulation signal before starting data transmission.

14. A communication method comprising:
sequentially changing a carrier frequency of a carrier to transmit data according to a spread code sequence for frequency hopping in which one period of the spread code sequence for frequency hopping is defined as one frame and a modulation of data as a primary modulation;
modulating data including at least phase shift as a primary modulation, and an angle area comprising a plurality of angle areas within one of which the phase falls is held in advance; and
sequentially obtaining information based on the phase shift by individually deciding which angle area the phase of a signal received falls within in each hopping period in each frame.

15. The method as claimed in claim 14, wherein
the plurality of angle areas include a no information area where the phase of the received signal is judged not to fall within any of the angle areas, and a signal actually received at a hopping period is dealt with as if it contained no phase information, if the phase thereof falls within the no information area.

16. The method as claimed in claim 14, wherein
the plurality of the angle areas include a plural information area where the phase of the received signal is judged to fall within plural angle areas, and a signal actually received at a hopping period is dealt with as if it contained plural phase information, if the phase thereof falls within the plural information area.

17. A device for communication comprising;
a receiver circuit which applies a bandpass filtering to a received signal transmitted in sequentially changed carrier frequencies according to a spread code sequence for frequency hopping,
a frequency converter which lowers frequency of an output signal of the receiver circuit to an aimed frequency band,
a spread control unit which performs spread control according to the spread code sequence for frequency hopping,
a frequency synthesizer which supplies, by a control of the spread control unit, frequency corresponding to each hopping period,
a mixer which mixes output of both the frequency synthesizer and the frequency converter,
a demodulator circuit which demodulates at least a phase of an output signal of the mixer,
a decoding circuit which judges a phase for each hopping period by using a demodulated phase, and
a synchronization circuit which controls operation timings of the spread control unit according to an instruction from the demodulator circuit.

18. The device as claimed in claim 17 wherein the spread control unit repeatedly mixes a partial code string which is a part of the spread code sequence for frequency hopping with the received signal, and the synchronization circuit acquires synchronization by judging detection level by referring to a signal obtained by the mixing.

19. The device as claimed in claim 17 wherein at least a data communication mode and a synchronization mode are provided separately; and wherein the synchronization circuit after synchronization acquisition, measures detection level in a receiver block while shifting hopping timing during the synchronization period, compares the detection level with detection level measured at a n original timing, and judges a difference in timings between a transmitter block and the receiver block, and synchronizes the hopping timings of the receiver block and the transmitter block, according to the judgment.

20. The device as claimed in claim 17 wherein one period of the spread code sequence for frequency hopping is defined as one frame; wherein the decoding circuit stores a phase shift of the hopping frequency, obtained by comparing the signals receive d at corresponding hopping periods in two different frames, in order to determine a correction phase for the hopping period;

decides a reference phase for each hopping period in each frame using the correction phase; and sequentially obtains information based on the phase shift by comparing the phases of a signal actually received during the hopping period with the reference phase.

21. The device as claimed in claim 17 wherein the decoding circuit holds in advance an angle area comprising a plurality of angle areas within one of which the phase falls, and sequentially obtains information based on the phase shift by individually deciding which angle area the phase of a signal received falls within in each hopping period in each frame.

* * * * *